United States Patent
Raboin et al.

(10) Patent No.: US 10,118,143 B2
(45) Date of Patent: *Nov. 6, 2018

(54) CERAMIC ORIFICE CHAMBER FOR FLUID CATALYTIC CRACKING UNIT

(71) Applicant: Total Raffinage Chimie, Courbevoie (FR)

(72) Inventors: Jean-Christophe Raboin, Chaumont sur Tharonne (FR); Marc Bories, Saint-Nazaire (FR); Michaël Echard, Montivilliers (FR); Romain Lesage, Montivilliers (FR); Lassad Rezgui, Bondy (FR)

(73) Assignee: Total Raffinage Chimie, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/327,418

(22) PCT Filed: Jul. 23, 2015

(86) PCT No.: PCT/EP2015/066922
§ 371 (c)(1),
(2) Date: Jan. 19, 2017

(87) PCT Pub. No.: WO2016/016100
PCT Pub. Date: Feb. 4, 2016

(65) Prior Publication Data
US 2017/0165624 A1 Jun. 15, 2017

(30) Foreign Application Priority Data
Jul. 28, 2014 (FR) ...................................... 14 57258

(51) Int. Cl.
*B01J 8/00* (2006.01)
*B01J 19/02* (2006.01)
(Continued)

(52) U.S. Cl.
CPC ............... *B01J 8/0065* (2013.01); *B01J 8/24* (2013.01); *B01J 19/02* (2013.01); *C10G 11/18* (2013.01); *B01J 2219/0263* (2013.01)

(58) Field of Classification Search
CPC ... B01J 8/0065; B01J 19/02; B01J 8/24; B01J 2219/0218; B01J 2219/0263;
(Continued)

(56) References Cited

U.S. PATENT DOCUMENTS

| | | | |
|---|---|---|---|
| 3,273,320 | A | 9/1966 | Delaune et al. |
| 5,637,815 | A | 6/1997 | Takahata et al. |

(Continued)

FOREIGN PATENT DOCUMENTS

| | | |
|---|---|---|
| EP | 0329494 A1 | 8/1989 |
| WO | 2012119805 A1 | 9/2012 |

OTHER PUBLICATIONS

International Search Report issued in PCT/EP2015/066922, dated Oct. 14, 2015, 5 pages.

*Primary Examiner* — Lessanework Seifu
(74) *Attorney, Agent, or Firm* — Albert Shung

(57) ABSTRACT

The invention relates to an orifice chamber designed to expand a gas, in particular intended for a fluid catalytic cracking unit, said orifice chamber comprising the following elements: a chamber having an axis (X), an inlet duct that opens into the chamber, an outlet duct located on the opposite side from the inlet duct following said axis (X), and a plurality of internal plates positioned crosswise to the axis (X) inside the chamber at a distance from one another along the axis (X), each internal plate being provided with a plurality of through-orifices, characterized in that at least the plurality of internal plates is made of a ceramic material.

14 Claims, 2 Drawing Sheets

Figure 1:
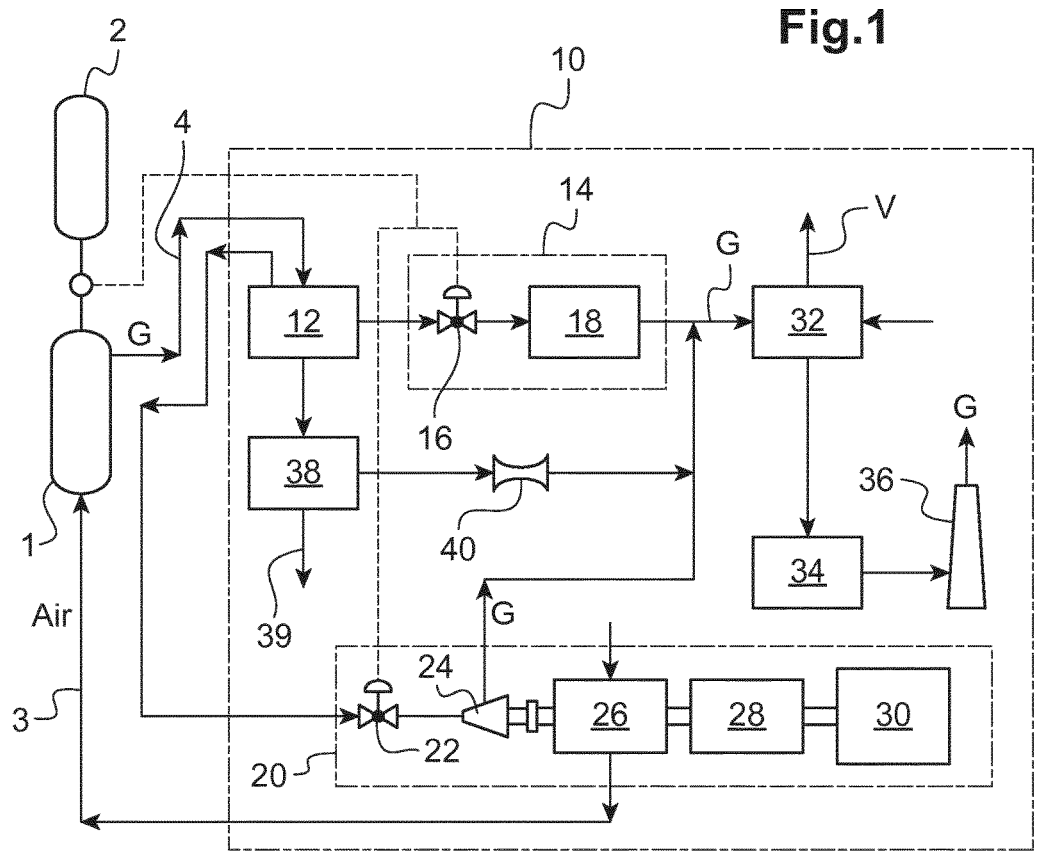

(51) Int. Cl.
*B01J 8/24* (2006.01)
*C10G 11/18* (2006.01)

(58) Field of Classification Search
CPC ........... C04B 2235/62218; C04B 2235/62844; C04B 35/64; C04B 35/80; C04B 35/803; C04B 35/806
See application file for complete search history.

(56) References Cited

U.S. PATENT DOCUMENTS

| | | | |
|---|---|---|---|
| 5,906,799 A | 5/1999 | Burgie et al. | |
| 6,170,528 B1 * | 1/2001 | Junier | F01N 1/083 138/37 |
| 2006/0266048 A1 * | 11/2006 | Bell | F01K 23/067 60/783 |
| 2009/0239007 A1 | 9/2009 | Meschke et al. | |

* cited by examiner

CERAMIC ORIFICE CHAMBER FOR FLUID CATALYTIC CRACKING UNIT

CROSS-REFERENCE TO RELATED APPLICATIONS

This application claims the benefit of PCT/EP2015/066922, filed Jul. 23, 2015, which claims priority from FR 1457258 filed Jul. 28, 2014.

The invention relates to an orifice chamber of a fluid catalytic cracking (FCC) unit.

In a fluid catalytic cracking unit, the orifice chambers are used to expand a gas which passes through them.

The invention relates to the problems of degradation of the metal walls of the internal equipment of a catalytic cracking unit. These degradation problems may be due to erosion caused by the circulation of abrasive catalyst particles within the catalytic cracking unit or to corrosion, owing to the presence of corrosive gases in certain portions of the catalytic cracking unit.

In an FCC unit, the feedstock to be treated and the catalyst are introduced together into a reactor in order to produce, by cracking, products of lower molecular mass. The gaseous effluents exiting the reactor and formed during the chemical reaction are separated from the particles of solid and coked catalyst in a disengager located downstream of the reactor. The chemical reaction produced in the FCC reactor leads to the formation of deposits of coke on the catalyst particles, requiring a continuous regeneration of this catalyst. The coked and separated catalyst is then transported as a continuous flow to a regenerator in which the coke is burnt off by injection of air. The hot catalyst thus regenerated is then reinjected at the inlet of the reactor with the fresh feedstock.

Although the catalyst stripped of its coke is continually discharged at the bottom portion of the regenerator, considerable amounts of solid particles of said catalyst remain entrained at the top outlet of said regenerator by the flue gas. These solid catalyst particles are recovered by means of a suitable device for separating and recovering these particles located inside the generator. This separation device generally comprises one or two cyclone stages which use centrifugal force to separate the particles from a gas. The flue gases, which contain CO and $CO_2$, exit the regenerator through the top thereof. These flue gases contain a significant amount of power and numerous schemes exist for recovering this power.

In certain units, the flue gas is sent to a CO boiler in which the CO of the flue gases is burnt in order to produce steam, especially high-pressure steam. In other units, the heat of the flue gases is recovered by a heat exchanger in order to produce steam.

In most units, the pressure of the flue gases is reduced by a control valve and an orifice chamber. Around one third of the pressure is reduced through the control valve and the remaining two thirds are reduced by the orifice chamber. An orifice chamber is a vertical or horizontal chamber containing a series of perforated plates, designed to maintain a reasonable pressure drop across the control valve. The chamber and the plates, are generally metallic. The office chamber and the control valve thus ensure the control of the internal pressure of the regenerator.

In certain relatively large units, a gas turbine may be used to recover the power from the flue gases. In this case, the flue gases generally pass through another separation device comprising one or more cyclones, often referred to as a third stage separation, before being sent to the gas turbine or optionally to the control valve and the orifice chamber.

Despite the particle separation and recovery devices inside the regenerator, and optionally outside the regenerator, the flue gases entering the orifice chamber still contain catalyst particles which may give rise to an erosion of the internals against which they may impact. Over time, an erosion of the plates of the orifice chambers is observed, reducing the expansion capacities of the latter and making the control of the pressure of the regenerator more difficult.

In order to reduce this erosion, it is possible to cover these plates with a protective coating. Such coatings generally consist of a composite material, in general a concrete, held by an anchoring structure, which is usually metallic. These anchoring structures are welded to the metal walls and thus provide the attachment of the composite material. They may have a honeycomb shape comprising a plurality of hexagonal cells firmly attached to one another via their sides. The anchoring structure is then welded to the metal wall by welding one portion only of the cells to the metal wall. Each cell is then filled with composite material. This configuration of the coating also makes it possible to ensure the absorption of the differences in expansion that exist between the metal anchoring structure and the composite material.

Such a coating makes it possible to protect the metal walls of the orifice chamber. However, over time a degradation of this coating is observed which may result in fragments of coating falling inside the chamber, which may impair the operation of the unit and require it to be shut down in order to replace the coating.

Moreover, such coatings must be produced manually and are particularly time-consuming and difficult to install. The maintenance operations are thus long and costly. These coatings also considerably weigh down the metal walls covered: indeed this type of coating frequently has a thickness of around 6 centimeters, which requires the production of metal walls of great thickness, further increasing the overall cost of the equipment. Finally, the orifice chambers must be designed as a function of the weight of these coatings and of their method of fastening, but also in order to reduce the risks of erosion. On account of these constraints, it is sometimes not possible to modify the shape of the chambers in order to improve their ability to expand a gas.

There is therefore a need for orifice chambers of an FCC unit that have a better resistance to erosion and the maintenance costs of which are lower.

For this purpose, one subject of the invention relates to an orifice chamber designed to expand a gas, in particular intended for a fluid catalytic cracking unit, said orifice chamber comprising the following elements:
a chamber having an axis X,
an inlet duct that opens into the chamber,
an outlet duct located on the opposite side from the inlet duct following said axis X, and
a plurality of internal plates positioned crosswise to the axis X inside the chamber at a distance from one another along the axis X, each internal plate being provided with a plurality of through-orifices, characterized in that at least the plurality of internal plates is made of a ceramic material.

According to the invention, each internal plate of the orifice chamber is made of a ceramic material.

Advantageously, the chamber and/or the inlet and outlet ducts may also be made of ceramic material, or else be made of metal, for example made of stainless steel.

In particular, each internal plate, and more specifically its walls, and optionally the other elements of the orifice chamber, at least their walls, is without a coating comprising an anchoring structure that defines cells filled with composite material of concrete or cement type, of the type described above. When the chamber is made of metal, it is however conceivable to cover the inner face of its walls with this coating.

The orifice chamber according to the invention has the advantage of being made of ceramic, at least as regards its internal plates.

Ceramic materials have proved suitable for the usage conditions of an FCC unit. In particular, these materials may have good corrosion resistance and thermal resistance.

Ceramic materials have a relatively high hardness, greater than the catalysts used in the FCC unit, namely a hardness of at least 1400 N/mm$^2$ as Vickers hardness. Preferably, the ceramic material has a hardness of greater than 2100 N/mm$^2$ or even greater than 2500 N/mm$^2$. Owing to this relatively high hardness, the orifice chamber according to the invention has the advantage of not requiring the presence of a protective layer on its walls: it is thus no longer necessary to protect the walls with coatings of the type of those described above for steel walls. The result of this is a considerable weight saving of the orifice chamber with respect to the steel orifice chambers customarily used.

The manufacture and the maintenance of the orifice chambers according to the invention is also facilitated with respect to the steel orifice chambers covered with a concrete-type coating owing to the absence of coating to be installed or to be repaired/replaced. The maintenance operations may also be spaced out or be shorter, which makes it possible to reduce the operating costs of the FCC unit significantly.

Owing to the absence of heavy and bulky coating on the walls of the orifice chambers according to the invention and owing to the high hardness of the plate, and optionally of the chamber, of these orifice chambers, it is henceforth possible to design the shape and the dimensions of the orifice chambers in order to improve their ability to expand a gas.

The ceramic material may be selected from silicon carbide SiC, boron carbide B$_4$C, silicon nitride Si$_3$N$_4$, aluminium nitride AlN, boron nitride BN, alumina Al$_2$O$_3$, or mixtures thereof.

Preferably, the ceramic material is silicon carbide SiC or comprises silicon carbide SiC, preferably in a majority amount, for example in a content of 60% to 99.9% by weight. Silicon carbide has the advantage of possessing good mechanical and physical properties for a reasonable manufacturing cost.

As a variant, or optionally in combination, the ceramic material may comprise a ceramic matrix selected from silicon carbide SiC, boron carbide B$_4$C, silicon nitride Si$_3$N$_4$, aluminium nitride AlN, alumina Al$_2$O$_3$, or mixtures thereof, incorporated in which ceramic matrix are carbon fibres or ceramic fibres or a mixture of these fibres.

The ceramic material is then a composite material. Such a composite material may be advantageous for the portions of the orifice chamber subjected to stretching and shear stresses. In particular, the fibres may be positioned randomly (pseudo-isotropically) or anisotropically. An anisotropic distribution of the fibres may be advantageous in particular zones, for example the end zones intended to be assembled with another material or with another part of the same material (mechanical assembly or welding, brazing) or in the case of zones subjected to a considerable stretching/shear stress. When they are present, these fibres may represent from 0.1% to 10% by weight of the composite material.

The carbon fibres may be carbon fibres with graphite planes oriented along the fibre.

The ceramic fibres may be selected from crystalline alumina fibres, mullite (3Al$_2$O$_3$, 2SiO$_2$) fibres, crystalline or amorphous silicon carbide fibres, zirconia fibres, silica-alumina fibres, or mixtures thereof.

Preferably, the composite ceramic material comprises a silicon carbide SiC matrix comprising fibres of the aforementioned type. Preferably, the fibres are silicon carbide fibres.

Advantageously and non-limitingly, the devices according to the invention are preferably made of CMC materials (CMC=Ceramic Matrix Composite), here identified as CMC devices. In other words, the composite material here above mentioned may be a CMC.

A method of preparation of these CMC devices is preferably performed as follows:

1) Shaping a fibrous ceramic material eventually over a supporting material that could be removed without excessive effort, in order to obtain a fibrous shape that can be assimilated to the backbone of the final device to be obtained, eventually in the presence of a first resin,
2) Coating the shape obtained at step (1) with finely divided ceramic powder and at least a second resin, eventually in the presence of finely divided carbon powder, to obtain a coated shape,
3) Eventually repeat steps (1) and (2),
4) Heating the coated shape of step (2) or (3) under vacuum and/or under inert atmosphere in order to transform the resins of step (1), (2) and eventually (3) into a carbon-rich structure, essentially deprived of other elements to obtain a carbon-rich coated shape,
5) Introducing a gas within the carbon-rich coated shape of step (4) under conditions efficient to transform the carbon-rich structure into carbide containing carbon-rich structure,
6) Eventually removing the supporting material of step (1), when present,
wherein carbon fibers are present at least at step (1), (2) and/or (3) within the fibrous ceramic material, within the finely divided ceramic powder, within the finely divided carbon powder, and/or within the first and/or second resin.

Preferably, the mixture of finely divided ceramic powder comprises ceramic fibers with lengths comprised between 100 nm to 5 mm in an amount from 0.1 to 20 Wt % relative to the total amount of finely divided ceramic powder+finely divided carbon powder when present.

Preferably, the fibrous ceramic material is made of non-woven fabric, woven fabric or knit made with at least one of thread, yarn, string, filament, cord, string, bundle, cable, eventually sewed to maintain the desired shape. The fibrous ceramic material and the resins can be present in an amount up to 50 wt % relative to the total amount of components. In these conditions, if a CMC is manufactured with 50 Wt % fibrous ceramic material and resins, and ceramic powder comprising 20 Wt % ceramic fibers is added, the overall content in free fibers, i.e. not contained in the fibrous ceramic material, before any thermal treatment, is 10 Wt %. (Wt %=weight percent).

The fibrous ceramic material is preferably made with carbon and/or silicon carbide fibers.

The first, second and further resin are independently selected among resins able to produce a carbon residue and to bind the different constituents of the ceramic material before thermal treatment. Suitable resins include preferably poly-methacrylic acid, poly methyl methacrylate, poly ethyl methacrylate, polymethacrylonitrile, polycarbonates, polyesters, polyolefins such as polyethylene and polypropylene, polyurethanes, polyamides, polyvinyl butyral, polyoxyethylene, phenolic resins, furfuryl alcohol resins, usual polymer precursors of carbon fibers such as polyacrylonitrile, rayon, petroleum pitch. The resins and their quantities are adjusted to the desired porosity that is obtained after thermal treatment of step (4) and before step (5). Preferably, the total porosity after treatment of step (4) should be comprised between 15 vol % and 25 vol %, more preferably between 20 vol % and 22 vol %. (Vol %=volume percent). Without wishing to be bound by theory, it is assumed the resins, when undergoing thermal treatment of step (4) transform into a network of cavities containing residual carbon atoms surrounded with voids. It is assumed the gas of step (5) moves preferentially within this network thus allowing improved homogeneity in the final CMC material. For example, 78 Wt % SiC powder which contains 0.2 Wt % of silicon carbide fiber is mixed with 17 Wt % phenolic resin and 5 Wt % poly methyl methacrylate and this mixture is used to impregnate and cover a silicon carbide fabric (which accounts for 20 Wt % of the overall weight) that surrounds a shaping support, then heated under inert gas atmosphere until complete carbonization of the resins to obtain a final product having from 16 vol % to 18 vol % total porosity.

The gas may be selected among $SiH_4$, $SiCl_4$, $ZrCl_4$, $TiCl_4$, $BCl_3$, to form corresponding carbide.

Preferred gas is $SiH_4$ or $SiCl_4$.

Preferred conditions of step (5) are standard RCVI conditions (Reactive Chemical Vapor Infiltration), more preferably using pulsed pressure.

Preferably steps (4) and (5) are each independently performed at a temperature comprised between 1100 and 1800° C. and at an absolute pressure comprised between 0.1 and 1 bar.

Preferably, the finely divided ceramic powder comprises, or eventually consists of, particles selected from silicon carbide SiC, boron carbide $B_4C$, silicon nitride $Si_3N_4$, aluminium nitride AlN, boron nitride BN, alumina $Al_2O_3$, or mixtures thereof.

Preferably, the finely divided carbon powder is carbon black.

A suitable but non limiting particle size range for the finely divided ceramic powder, and eventually finely divided carbon powder, is about 10 micrometers or less.

Such a method of preparation allows improved homogeneity in the CMC material in that porosity gradient and clogging at the surface of the material is considerably reduced or totally alleviated, depending on the experimental conditions (low temperatures ca. 1100-1300° C. and reduced pressure ca. 0.1-0.5 bar abs. are preferred).

Advantageously and non-limitingly, the ceramic material may be a sintered ceramic material. This may in particular facilitate the production of elements made of ceramic, whether they are made from one or more portions.

In one particular embodiment, each element of the orifice chamber, in particular each internal plate, may be formed from one part made of ceramic material, without welding or assembly, for example obtained by sintering. The sintering step may be preceded by a conventional shaping step, for example by compression, extrusion or injection. Each element may also be formed for example by moulding or by extrusion, followed by a firing of the green element, under conventional operating conditions suitable for the type of ceramic produced. The firing step is optionally preceded by a drying step.

Sintering is a process for manufacturing parts that consists in heating a powder without melting it. Under the effect of heat, the grains fuse together, which forms the cohesion of the part. Sintering is especially used for obtaining the densification of ceramic materials and has the following advantages:
 it makes it possible to control the density of the substance; as a powder is used to start with and since this powder does not melt, it is possible to control the size of the powder grains (particle size) and the density of the material, depending on the degree of initial compacting of the powders;
 it makes it possible to obtain materials having a controlled porosity, that are chemically inert (low chemical reactivity and good corrosion resistance) and thermally inert;
 it makes it possible to control the dimensions of the parts produced: as there is no change of state, the variations in volume and in dimensions are not very large with respect to melting (absence of shrinkage phenomenon).

In another particular embodiment, a portion of the orifice chamber entirely made of ceramic material may be made of several separate parts assembled together.

Advantageously and non-limitingly, the walls of the plates and optionally the internal walls of the chamber may be smooth, in other words they may have a low surface roughness. This makes it possible to limit the adhesion of particles to these walls and also enables the reduction of the formation of catalyst fines and facilitates a subsequent separation of the particles remaining in the flue gases.

Such a smooth wall may be obtained when the ceramic material is a sintered ceramic material.

Advantageously and non-limitingly, the portions made of ceramic material may be obtained from a relatively fine sintering powder, for example having a mean grain diameter of less than or equal to 500 nm, which may result in relatively smooth surfaces.

Alternatively or in addition, the portions made of ceramic material may be obtained by adding to the main material, for example SiC, an additive selected from boron B, silicon Si and carbon C, or mixtures thereof, for example in a proportion varying from 0.3% to 2% by weight. In the case of an SiC material obtained by powder sintering, such an addition of additive may make it possible to reduce the porosity and consequently the roughness.

Advantageously and non-limitingly, the additive may comprise a mixture of boron B, silicon Si and carbon C. It may thus form additional SiC, which blocks the pores and thus reduces the roughness.

Alternatively or in addition, a step of additional deposition of SiC by chemical vapour deposition (CVD) could for example be provided.

As already mentioned, elements of the orifice chamber, in particular at least the internal plates and the chamber, and optionally the inlet and outlet ducts, may be separate elements made of ceramic material that are assembled together.

Furthermore, each separate element made of ceramic material of the orifice chamber or at least one of the separate elements of the orifice chamber may also be made of several portions assembled together. Each portion may in particular be obtained by sintering.

The separate elements of the orifice chamber, and/or the portions forming these elements, may be connected by welding or brazing. The assembling may for example be carried out by a diffusion welding process, for example as described in document US 2009/0239007 A1.

As a variant or in combination, separate elements of the orifice chamber to be assembled and/or portions forming these elements to be assembled may have ends shaped in order to be assembled by interlocking or screwing.

Advantageously, the ends of the portions or elements assembled by interlocking or screwing may have a conical shape, which may make it possible to simply reduce the stresses between the parts and to improve the leaktightness between the parts.

For example, the chamber may have an axis of symmetry and its various elements may be cylindrical or conical. When the chamber is made of several elements to be assembled, these elements may be sections of the chamber along its axis of symmetry: each element is then a cone section or cylinder section, and these elements may be assembled by screwing or interlocking of their ends or by welding or brazing.

By way of example, the chamber may be made of at least two portions each produced from a single part with an inlet and outlet duct and each internal plate may be produced from a single part. The internal plates of the orifice chamber may be assembled with the chamber by welding or brazing.

It may also be envisaged that the gas inlet and outlet ducts are separate parts assembled with the chamber by screwing, their ends to be assembled then having a rotational symmetry, or interlocking, preferably by cooperation of conical shapes, or by welding or brazing.

The invention is not however limited by the shape and number of separate elements to be assembled.

Advantageously, for better leaktightness, a seal may be positioned between the portions or elements assembled by interlocking or screwing. It may be, for example, a seal made of carbon or made of any other suitable material, for example made of vermiculite or made of another compressible and thermally stable material. Optionally, a seal may be positioned between portions or elements assembled by interlocking or screwing having a conical shape.

The orifice chamber according to the invention may be made of ceramic material, at least as regards its main elements, namely the chamber and the internal plates. It may however be possible to provide the chamber with an external reinforcement, preferably a light reinforcement in order not to considerably increase the weight of the orifice chamber.

Advantageously and non-limitingly, the chamber made of ceramic material may have a reinforcing outer covering in mesh form, for example made of steel. This may make it possible to reduce the thickness of the walls of the chamber without deteriorating its mechanical strength.

In another embodiment, the chamber and optionally the inlet and outlet ducts may be made of metal, for example made of steel, in particular made of stainless steel. The internal plates made of ceramic material may then be assembled with the metal chamber by fastening means capable of absorbing a difference in expansion between the metal of the chamber and the ceramic material of an internal plate.

For example, such fastening means may be formed by a layer of materials essentially comprising assembled ceramic fibres having a non-zero elastic modulus, this layer being positioned between a portion made of ceramic material and a metal portion and providing the cohesion of these portions.

Alternatively, the geometry and the dimensions of the fastening means may be adapted in order to compensate for the difference in thermal expansion between the metal and the ceramic material.

The fastening means may comprise one (or more) pressing element(s) capable of exerting an elastic force on a portion made of ceramic material to be assembled to a metal portion in order to press this portion made of ceramic material against the metal portion.

Thus, the fastening withstands the differential expansion between the material of the metal portion, for example a steel, preferably a stainless steel, and the ceramic material. Indeed, the ceramic may have a coefficient of thermal expansion that is much lower than that of the steel.

The pressing element may for example comprise a spring means, or other means. It might be possible, for example, to provide one or more fastening tabs that are firmly attached to (or form a single part with) a metal portion, for example that are welded. These tabs, on the one hand welded via one end to the metal portion, while the other end rests on a surface of a portion made of ceramic material, make it possible to exert an elastic bearing force on the portion made of ceramic material so as to keep this portion pressed against the metal portion. This other end may have a relatively flat surface in order to limit the zones of high mechanical stresses.

In particular, the fastening means may comprise at least one metal tab firmly attached to an internal fastening face of the chamber and capable of elastically bearing against an edge of the internal plate in order to keep this edge bearing against the fastening face of the chamber. Such a fastening face may be an annular support or a flange extending from an internal sidewall of the chamber, crosswise to the axis X of the chamber.

The invention also relates to a system for recovering power from the flue gases exiting a regenerator of a fluid catalytic cracking unit comprising at least one orifice chamber according to the invention. Such a recovery system may in particular, comprise, from upstream to downstream, following the circulation of the flue gases inside said system, a control valve, an orifice chamber, a heat recovery device in order to produce steam, such as for example a CO boiler or a heat exchanger, and optionally an electrostatic precipitator.

Finally, the invention also relates to a catalytic cracking unit comprising at least one orifice chamber according to the invention and/or at least one power recovery system according to the invention.

Figure 2:
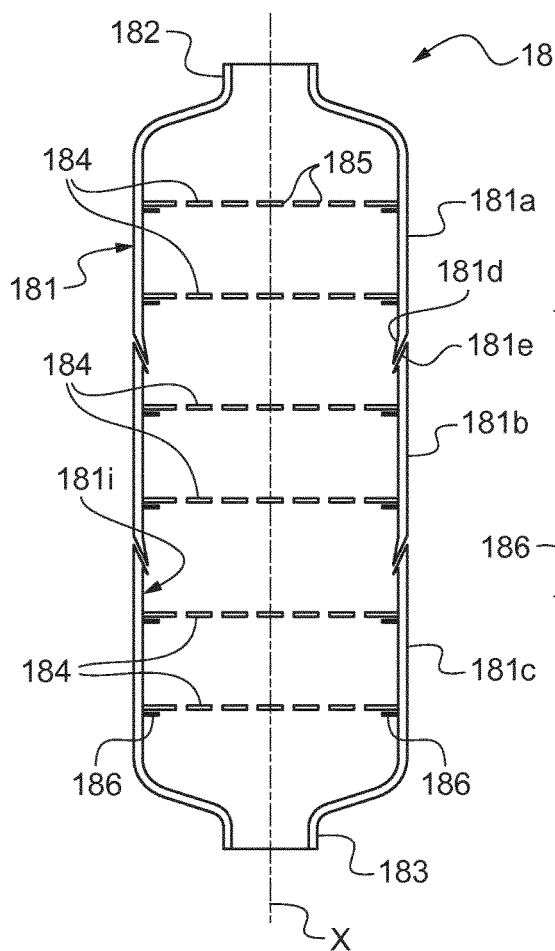
Figure 3:
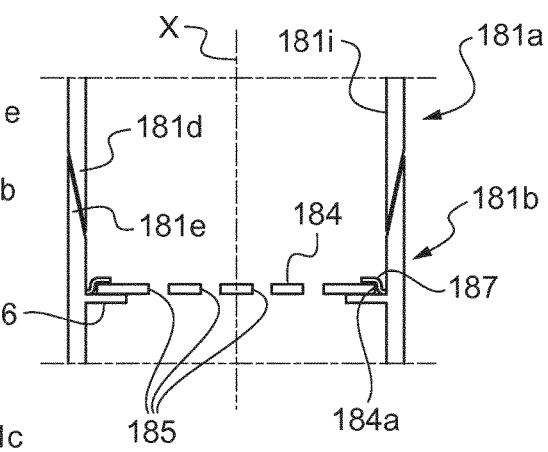
Figure 4A:
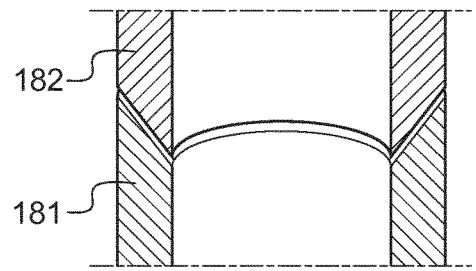
Figure 4B:
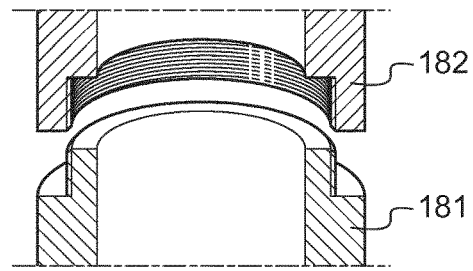

The invention is now described with reference to the appended, non-limiting drawings, in which:

FIG. 1 is a schematic representation of a system for recovering power from the flue gases of an FCC unit, FIG. 2 is a schematic representation, in axial cross section, of an orifice chamber, FIG. 3 is an enlargement of FIG. 2, FIGS. 4a and 4b are axial cross-sectional views of the ends of two assembled parts. The assembled parts are separated in FIG. 4b for greater clarity.

In the present description, the terms "upstream" and "downstream" refer to the direction of circulation of the flue gases.

FIG. 1 represents a system 10 for recovering power from the flue gases of an FCC unit. This system is of a type known per se.

Represented in FIG. 1 are a regenerator 1 that supplies a reactor 2 with regenerated catalyst, in which reactor catalytic cracking reactions of a hydrocarbon feedstock take place.

In the regenerator 1, the coke, deposited on the catalyst particles during catalytic cracking reactions, is burnt off using air injected at the base of the regenerator 1 through a line 3. The flue gases G, after separation of the particles through one or two cyclone stages (not represented) located in the upper portion of the regenerator, are discharged through a line 4 to the recovery system 10.

In the example represented, this recovery system 10 comprises a third stage separation 12 located downstream of the regenerator 1. This third stage separation 12, which comprises one or more cyclones (not represented), thus collects the flue gases G directly exiting the regenerator 1.

The recovery system 10 additionally comprises, from upstream to downstream, starting from the third stage separation 12, a flue gas expansion train 14 comprising:
- a control valve 16,
- an orifice chamber 18.

The above expansion train 14 may be used as a bypass of a power recovery train 20, which is also located downstream of the third stage separation 12, directly connected to the latter.

This power recovery train 20 comprises:
- a control valve 22,
- an expander 24,
- an air blower 26, which provides the regenerator 1 with the air needed for the combustion,
- a generator 28,
- optionally a start-up steam turbine 30.

Such a power recovery train is known and will not be explained further.

Finally, the flue gases exiting the orifice chamber 18 and/or the expander 24 are then successively treated in:
- a heat recovery device 32 in order to produce a flow of steam V, such as for example a CO boiler or a heat exchanger,
- an electrostatic precipitator 34, before being discharged through a stack 36.

On the diagram represented in FIG. 1, the expansion train 14 essentially makes it possible to control the pressure of the regenerator 1 when the power recovery train 20 is not operating or when the flue gas flow rate reaches the maximum capacity of the expander 24.

The power recovery system represented also comprises a $4^{th}$ stage separation 38 of particles, downstream of the third stage separation 12, and an injection nozzle 40. The solid catalyst particles are recovered by the line 39.

In a variant that is not represented, the recovery train 20 may be absent: the third stage separation 12 may then be omitted, as well as the fourth stage separation 38 and the injection nozzle 40.

The invention is not limited to the flue gas power recovery system described and relates to any known system for recovering power from the flue gases of an FCC unit.

FIG. 2 schematically represents, in longitudinal cross section, an orifice chamber 18 which comprises:
- a chamber 181 having an axis (X),
- an inlet duct 182 that opens into the chamber 181,
- an outlet duct 183 located on the opposite side from the inlet duct 182 following said axis (X), and
- a plurality of internal plates 184 positioned crosswise to the axis X inside the chamber at a distance from one another along the axis X, each internal plate being provided with a plurality of through-orifices 185. These orifices 185 are designed to provide a reduction of the pressure of the flow circulating through the orifice chamber 18.

In general, as represented in the example, the chamber 181 is formed of several sections 181a, 181b, 181c interlocked in twos via conical end portions 181d, 181e. Two adjacent sections are represented in detail in FIG. 3. In general, a chamber 181 has a cylindrical shape, for example a diameter of the order of 50 cm to 1 m for a height of approximately 5 meters. The orifices 185 of the plates are the order of 10 cm in diameter.

According to the invention, at least the internal plates 184 are made of ceramic material, preferably of silicon carbide SiC. They are for example formed by injection moulding or extrusion. Injection moulding or extrusion are conventionally carried out using ceramic powders or precursors of ceramics with a binder. According to another manufacturing method, the ceramic internal plates are formed by compression and heating of a ceramic powder, it being possible for the compression to be maintained during the heating step, the heating step being a step of sintering the ceramic powder. This technique is particularly well suited to the manufacture of solid elements made of silicon carbide according to the invention. The ceramic powder used optionally comprises ceramic fibres in order to increase the mechanical strength of the parts produced. The ceramic fibres, when they are present, generally represent from 0.1% to 10% by weight of the part produced.

These internal plates 184 may be fastened to a fastening face 186, which is present in the form of an annular support (or flange) in the example, firmly attached to be internal wall 181i of the chamber. This fastening face or annular support 186 extends crosswise to the axis X.

If the chamber is made of metal, this annular support is then also made of metal and an internal plate 184 made of ceramic material may be assembled to the annular support 186 by at least two metal tabs 187 firmly attached to the annular support 186 and shaped to bear against the edge 184a of an internal plate 184 in order to keep this edge 184a bearing against the annular support 186 of the chamber. In this case, the internal plate 184 has dimensions slightly smaller than the internal dimensions of the chamber in order to allow the installation of the metal tabs 187. As a variant, these metal tabs 187 could be welded directly to the internal wall 181i of the chamber 181.

As a variant, the chamber 181, in other words each section 181a, 181b, 181c of the chamber in the example represented, may also be made of ceramic material. In this case, the internal plates 184 may be assembled to the fastening face 186 by brazing or welding, a seal being optionally inserted between the fastening face 186 and the internal plate 184.

If the inlet duct 182 and outlet duct 183 are also made of ceramic material, they may be produced from one part with the chamber or a section of the chamber.

The inlet duct 182 and outlet duct 183 made of ceramic material may also be parts separate from the chamber and be assembled thereto. An inlet duct 182 (or an outlet duct) may for example be interlocked with the chamber 181 as represented schematically in FIG. 4a by interlocking of conical end portions of complementary shape, or by screwing of their ends (FIG. 4b), or else welded or brazed (not represented). Similarly, the sections of the chamber may be separate portions that are assembled, it being possible for this assembling to be carried out as described above, by assembling cylindrical or conical sections, or else by assembling parts resembling bricks by interlocking and/or welding/brazing.

The invention is not limited to the examples described. In particular, the chamber 181 may be produced from a single part, made of metal or made of ceramic material, and not from assembled sections. The various embodiments described, and in particular the various methods of assembly, may in addition be combined.

The invention claimed is:

1. An orifice chamber designed to expand a gas, in particular intended for a fluid catalytic cracking unit, said orifice chamber comprising the following elements:
   - a chamber having an axis (X),
   - an inlet duct that opens into the chamber,
   - an outlet duct located on the opposite side from the inlet duct following said axis (X), and a plurality of internal plates positioned crosswise to the axis (X) inside the chamber at a distance from one another along the axis (X), each internal plate being provided with a plurality of through-orifices, characterized in that at least the plurality of internal plates is made of a ceramic material and the ceramic material comprises a ceramic matrix selected from the group consisting of silicon carbide SiC, boron carbide $B_4C$, silicon nitride $Si_3N_4$, aluminium nitride AlN, boron nitride BN, alumina $Al_2O_3$, and mixtures thereof, in which carbon fibres or ceramic fibres are incorporated in the ceramic matrix.

2. The orifice chamber according to claim 1, characterized in that the chamber and/or each duct is made of metal or made of ceramic material.

3. The orifice chamber according to claim 1, characterized in that the ceramic fibres comprise crystalline alumina fibres, mullite fibres, crystalline or amorphous silicon carbide fibres, zirconia fibres, silica-alumina fibres, or mixtures thereof.

4. The orifice chamber according to claim 1, characterized in that the ceramic material is a sintered ceramic material.

5. The orifice chamber according to claim 1, characterized in that the ceramic material is a Ceramic Matrix Composite (CMC).

6. The orifice chamber according to claim 1, characterized in that each internal plate is formed from one part made of ceramic material.

7. The orifice chamber according to claim 1, characterized in that the elements are separate elements made of ceramic material that are assembled together, a separate element being made of one part or being made of several portions assembled together.

8. The orifice chamber according to claim 1, characterized in that the elements and/or the portions are assembled by welding or brazing or in that elements to be assembled and/or portions to be assembled have ends shaped in order to be assembled by interlocking or screwing.

9. The orifice chamber according to claim 1, characterized in that the chamber is made of metal and in that the internal plates made of ceramic material are assembled to the metal chamber by fastening means capable of absorbing a difference in expansion between the metal of the chamber and the ceramic material of an internal plate.

10. The orifice chamber according to claim 1, characterized in that the chamber is made of ceramic material and has a reinforcing outer covering in mesh form.

11. A system for recovering power from the flue gases exiting a regenerator of a fluid catalytic cracking unit comprising at least one orifice chamber according to claim 1.

12. A catalytic cracking unit comprising at least one orifice chamber according to claim 1.

13. The catalytic cracking unit according to claim 12 further comprising the system for recovering power according to claim 11.

14. A method of preparing an orifice chamber made of Ceramic Matrix Composite (CMC), comprising:
1) shaping a fibrous ceramic material over a supporting material that could be removed without excessive effort, in order to obtain a fibrous shape that can be assimilated to the backbone of the final device to be obtained, in the presence of a first resin,
2) coating the shape obtained at step (1) with finely divided ceramic powder and at least a second resin, in the presence of finely divided carbon powder, to obtain a coated shape,
3) repeat steps (1) and (2),
4) heating the coated shape of step (2) or (3) under vacuum and/or under inert atmosphere in order to transform the resins of step (1), (2) and (3) into a carbon-rich structure, essentially deprived of other elements to obtain a carbon-rich coated shape,
5) introducing a gas within the carbon-rich coated shape of step (4) under conditions efficient to transform the carbon-rich structure into carbide containing carbon-rich structure,
6) removing the supporting material of step (1), when present,
wherein carbon fibers are present at least at step (1), (2) and/or (3) within the fibrous ceramic material, within the finely divided ceramic powder, within the finely divided carbon powder, and/or within the first and/or second resin.

* * * * *